Figure 1:
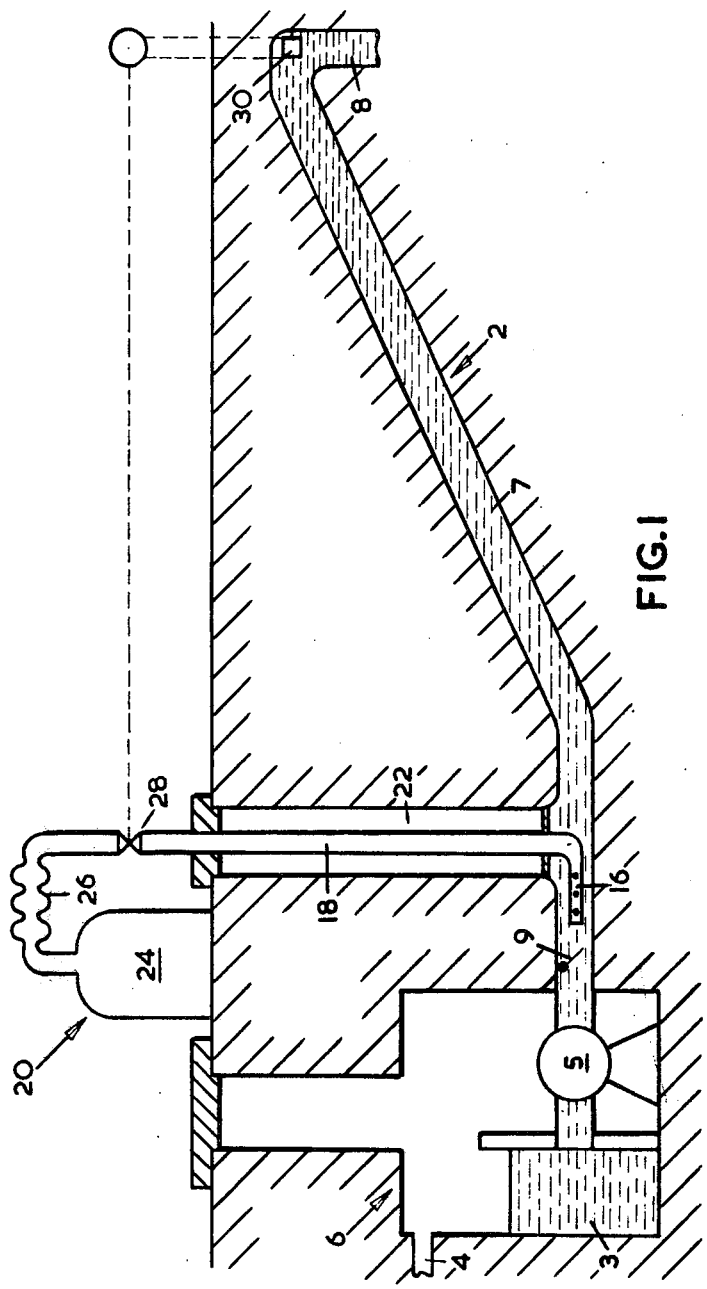

United States Patent [19]
Smith et al.

[11] 4,115,258
[45] Sep. 19, 1978

[54] TREATMENT OF SEWAGE

[76] Inventors: Kenneth Cecil Smith, Lunga House, Epping Rd., Roydon, Essex; Michael Ernest Garrett, 9 Sandy Rd., Addlestone, Surrey, both of England

[21] Appl. No.: 698,758

[22] Filed: Jun. 22, 1976

Related U.S. Application Data

[63] Continuation of Ser. No. 429,744, Jan. 2, 1974, abandoned.

[30] Foreign Application Priority Data

Jan. 8, 1973 [GB] United Kingdom ................. 1028/73
Mar. 1, 1973 [GB] United Kingdom ............... 10080/73
Aug. 17, 1973 [GB] United Kingdom ............... 38910/73

[51] Int. Cl.² .............................................. C02C 1/02
[52] U.S. Cl. .................................. 210/15; 210/63 R; 210/170
[58] Field of Search ........... 210/15, 170, 63 R, 198 R, 210/209, 220, 258; 261/DIG. 75

[56] References Cited
U.S. PATENT DOCUMENTS

| | | | |
|---|---|---|---|
| 3,525,685 | 8/1970 | Edwards | 210/15 |
| 3,607,735 | 9/1971 | Hover et al. | 210/170 |
| 3,663,117 | 5/1972 | Warren | 261/DIG. 75 |
| 3,734,850 | 5/1973 | Karr | 210/220 |
| 3,957,633 | 5/1976 | Gatti et al. | 210/220 |
| 4,042,494 | 8/1977 | Stoyer | 210/170 |

*Primary Examiner*—Thomas G. Wyse
*Attorney, Agent, or Firm*—Dennison, Dennison, Meserole & Pollack

[57] ABSTRACT

Pure oxygen or a gas containing substantially more oxygen than air is injected under pressure into sewage held in or flowing through a rising or pumping sewer. This injection may be used to prevent the concentration of dissolved oxygen in the sewer falling to a level at which there occurs bacterial reduction to hydrogen sulphide of sulphate present in the sewage and/or to reduce the Biochemical Oxygen Demand of the sewage. The injection can also be used to oxidize to sulphur any sulphide dissolved in the sewage.

The pure oxygen or the gas containing more oxygen than air may be injected into sewage flowing through a sewage pipe forming part of a rising or pumping sewer, into a pump used to transfer the sewage through the sewer, or into a part of the sewer (e.g. a sump) where sewage is collected before being transferred through the sewer.

10 Claims, 1 Drawing Figure

TREATMENT OF SEWAGE

This application is a continuation of U.S. application Ser. No. 429,744, filed Jan. 2, 1974, now abandoned.

BACKGROUND OF THE INVENTION

Field of the Invention

The invention relates to a process of, and apparatus for, treating sewage while it is being held in or is flowing through a rising or pumping sewer.

Description of the Prior Art

Problems can arise in conveying sewage through rising or pumping sewers as a result of the action of facultative bacteria present in the sewage. These bacteria normally respire oxygen dissolved in the sewage, but if this supply of oxygen is exhausted, they obtain their oxygen for respiration by reducing compounds containing oxygen, particularly sulphates.

This bacterial reduction of sulphates yields hydrogen sulphide, a malodorous, poisonous gas. Sometimes lethal concentrations of hydrogen sulphide are created at locations that are accessible to maintenance engineers, and there is frequently escape of hydrogen sulphide from the sewer to above ground. In particular, hydrogen sulphide can be formed in rising main sewers in view of the exclusion of air from between the pump-house and the discharge end of the sewer. In consequence the presence of hydrogen sulphide is often detected just beyond the outlet of a rising sewer.

Formation of hydrogen sulphide is particularly marked under hot climatic conditions, since these conditions promote bacterial activity.

Various methods have been tried in order to prevent the bacterial activity which forms hydrogen sulphide. For example, bacterial activity can be inhibited by the addition of gaseous chlorine, but this can result in the sterilisation of the sewage. Moreover, chlorine itself is both highly corrosive and toxic.

It has been proposed to freshen sewage by adding air. With air, however, once a concentration of dissolved oxygen of 10 ppm has been attained, no more oxygen will dissolve. Furthermore, the sewage is usually saturated with nitrogen before the air is introduced. Accordingly, none of the nitrogen contained in the air is dissolved. This undissolved nitrogen can cause gas locks and other hydraulic problems in the sewer.

One example of a proposal to introduce oxygen into a gravity sewer is contained in U.S. Pat. No. 3,525,685 (Edwards).

Air at atmospheric pressure or other oxygen-containing gas is bubbled into sewage flowing through a gravity sewer. The air or other oxygen-containing gas is intended to escape from the liquid sewage surface and force the lighter sewage gases out of the sewage system, thus allowing a constantly changing liquid surface to further promote oxygen absorption by the sewage. Although it is stated in U.S. Pat. No. 3,525,685 that the invention described therein may be applied to a force mains this would in fact result in most of the gas remaining undissolved. This will give rise to 'plugs' of gas which will expand as the pressure along the main reduces, thereby causing violent geysering and quantities of sewage being ejected, typically 30 or 40 feet in an upwards direction, at the discharge of the main. Moreover, conventional pumped sewage mains are built such that they follow the topography of the land. This generally requires the installation of several siphons and inverted siphons along the length of the main. Undissolved gas will collect in the siphons and thereby increase the pressure required to pump sewage through the main and severely reduce the pumping flow rate. There is thus a considerable increase in the power requirements of the pumps.

In U.S. Pat. No. 3,335,082 it is proposed to pass air along the ullage space of a pipe forming part of a gravity sewer. However, this technique is inapplicable to a rising or pumping sewer as such sewers do not have pipes with ullage spaces.

Proposals have been made to introduce pure oxygen into sewage being treated in the secondary stage of an activated sludge plant. Such a process is described in U.S. Pat. No. 3,607,735.

SUMMARY OF THE INVENTION

It is an object of the invention to provide a process and an apparatus for preventing bacterial formation of hydrogen sulphide in a rising or pumping sewer or for oxidising to sulphur any sulphide dissolved in the sewage therein.

It is another object of the invention to provide both a proces which can be performed in an established pumping or rising sewer and an apparatus which can be installed in an established pumping or rising sewer.

According to the present invention there is provided a process of treating sewage while it is being pumped through a rising or pumping sewer, in which a gas containing at least 90% by volume of oxygen is injected under pressure into the sewage in the sewer and is substantially all dissolved therein.

By this process there can be maintained a concentration of dissolved oxygen sufficient to prevent bacteria present in the sewage reducing compounds containing oxygen. Treatment with oxygen-rich gas can also oxidise any sulphide dissolved in the sewage.

The term "rising or pumping sewer" as used in this specification, includes within its scope a conduit which is connected between a source of untreated sewage and a treatment plant (e.g. an activated sludge or biological filtration plant) or, if the sewage is not to be treated in such a plant, a place of disposal. The term 'sewer' as used in this specification, also includes within its scope any pumping equipment used to transfer sewage through the rest of the sewer.

A gravity sewer slopes downwards in the direction of the flow of sewage there through so that the passage of the sewage is effected by gravity. In a rising or pumping sewer transfer of sewage is effected by a pump. A rising sewer may comprise a conduit which follows the undulations of the ground in which it has been laid. This type of rising sewer is sometimes referred to as a pumping sewer or main. Lengths of it may have a downward inclination in the direction of the flow of the sewage. Alternatively, a rising sewer can include a cylindrical pipe which is inclined so that it rises continuously or for most of its length in the direction of flow of the sewage therealong.

In a series of sewers, it is generally desirable to inject the oxygen-rich gas into a sewer sufficiently near to the source of the sewage to ensure that bacterial reduction of compounds containing oxygen and sulphur does not start before the sewage reaches the region where oxygen-rich gas is injected. If desired, oxygen-rich gas can be injected into more than one sewer in the series.

The oxygen-rich gas can, if desired, include a small proportion of ozone or other gas which has a beneficial effect.

If desired, the oxygen-rich gas can be formed by enriching air in oxygen.

In a rising sewer, in particular, it is generally necessary to dissolve in the sewage substantially all the oxygen and any other gas contained in the oxygen-rich gas. Large volumes of undissolved gas would hinder pumping of the sewage through the rising main. Hence care should desirably be taken to ensure that substantially no insoluble gas be introduced into any volume of sewage contained within a rising sewer. It is therefore, in general, desirable to use an oxygen-rich gas which contains at least 90% by volume of oxygen, and which preferably contains at least 98% by volume of oxygen. This keeps to manageable proportions the amount of any unwanted gas, such as nitrogen, that needs to be dissolved in the sewage.

In performing the process according to the present invention it is usually not desirable to inject so much oxygen-rich gas at any one region as to exceed its solubility limit in the sewage. Consequently injection at discrete intervals along the length of the sewer or a sewerage system is sometimes desirable.

A variety of sources of oxygen-rich gas are available. For example, pure oxygen could be supplied from an insulated vessel in which liquid oxygen is stored and passed through an evaporator prior to its introduction into the sewage. Alternatively pure oxygen could be supplied from one or more gas storage cylinders. Oxygen-rich air could be supplied from an air separation plant operating a pressure swing adsorption-desorption cycle. If required, another gas or gases could be admixed with the oxygen or oxygen-enriched air. A pressure from 5 to 10 bars is also suitable.

The oxygen-rich gas is preferably injected into sewage in a rising sewer in fine bubbles, typically having a diameter of 0.05 to 0.15 mm, so as to facilitate its dissolution. Difficulty in dissolving the oxygen-rich gas is unlikely to arise if the gas is injected downstream of the pumphouse of a rising sewer.

In a gravity sewer or the sump of a rising sewer failure to dissolve substantially all the oxygen in the oxygen-rich gas could be dangerous. This is because inflammable vapour is sometimes present in the air space above the level of the sewage. Thus undissolved oxygen entering the air space could cause an explosion.

In order to avoid any difficulty in effecting its dissolution, the oxygen-rich gas may first be introduced into a pressurised stream of sewage or water, which stream is then injected into the sewage in the sewer. The stream of sewage is preferably taken from sewage flowing through the sewer. This may be performed in accordance with the process described in our German Offenlegungsschrift No. 2,400,653. Such a system is particularly suitable for use with a sump in the pumphouse of a rising sewer. If the incoming sewage contains dissolved oxygen, it is often desirable in a rising sewer to inject the oxygen-rich gas sufficiently near to the inlet of the sewer to ensure that bacterial reduction of compounds containing oxygen and sulphur does not start before the sewage reaches the region or regions of injection. This is often a desirable practice in a rising sewer, too. Consequently it is often preferable to inject the oxygen-rich gas near to the inlet of a rising sewer.

In a rising sewer, however, any hydrogen sulphide formed will be dissolved in the sewage and will not be released until the sewage is discharged from the sewer. Accordingly, sulphide present in the sewage entering a rising sewer or formed during its residence therein can be oxidised by the process according to the present invention. Preferably the oxygen-rich gas is injected for this purpose at a sufficient distance from the outlet of the sewer as to ensure that all the sulphide is oxidised before the sewage is discharged from the sewer.

In a rising sewer the oxygen-rich gas is preferably injected at one or more regions between the outlet of the sewer and a non-return valve which is located in the sewer near to the pump so as to prevent back-flow of the sewage. If the oxygen-rich gas is introduced at such a region or regions, it is preferably injected for at least the greater part of a period during which sewage is pumped through the sewer.

If desired, the oxygen-rich gas may be injected into the sewage collected in a sump prior to its being pumped through the rest of a rising sewer, or it can be injected into the volute of the pump of a rising sewer whilst the sewage is being passed through the rising sewer. The minimum quantity of oxygen-rich gas required to prevent the concentration of dissolved oxygen in the sewage from falling to or below a level at which there starts the bacterial reduction of compounds containing oxygen and sulphur depends on a number of factors. Important factors are the temperature of the sewage, the time for which the sewage is resident in the sewer, and the rate at which the sewage consumes dissolved oxygen. Also important are the internal dimensions of the sewer since populations of facultative bacteria tend to be present on the inner walls of the sewer. As all these parameters can be determined empirically the minimum quantity of oxygen-rich gas that needs to be injected into a given volume of sewage can readily be calculated given a knowledge of the dissolved oxygen concentration of the incoming sewage. A dissolved oxygen meter can be used to measure the dissolved oxygen concentration.

It is desirable to monitor one or both of the dissolved oxygen concentration or BOD (Biochemical Oxygen Demand) of the sewage downstream of where the oxygen-rich gas is introduced and to adjust the rate at which the oxygen is injected in accordance with changes in the monitored value. A dissolved oxygen meter can be used to measure the dissolved oxygen concentration and an on-site BOD detector can be used to measure the BOD. This procedure is able to take account of unexpected diurnal and climatic variations in the oxygen demand exerted by the sewage. If desired, a control system can effect the adjustment automatically, the rate of injection being increased, preferably in steps, if the dissolved oxygen content of the sewage falls by a chosen amount and being decreased preferably in steps, if the dissolved oxygen content of the sewage rises by a chosen amount. For example, electrical signals generated by the dissolved oxygen meter can be used to actuate one or more solenoids in the control circuit of a solenoid valve controlling the passage of the oxygen-rich gas to the injector.

In a rising sewer whose length is sufficiently short to require introduction of the oxygen-rich gas in one region only, it is convenient to monitor the dissolved oxygen content at or near to the outfall of the sewer. If the length of the rising sewer is such that introduction of oxygen-rich gas at more than one region is desirable, the dissolved oxygen concentration is preferably monitored between regions and downstream (with reference to the direction of flow of the sewage) of the region nearest the outlet.

If the treatment is required to oxidize dissolved sulphide to sulphur, the quantity of oxygen-rich gas to be injected can be that required both to oxidize all the sulphide dissolved in the sewage and to prevent further bacterial reduction of sulphate. Moreover, the concentration of the dissolved sulphide can be monitored upstream or downstream (with reference to the direction of flow of the sewage) of where the oxygen-rich gas is injected, and the rate of injection adjusted in accordance with increases or decreases in the measured dissolved sulphide concentration. The degree to which lead acetate is darkened by sulphide is one way of estimating the dissolved sulphide concentration.

There is frequently considerable diurnal fluctuation in the rate at which sewage flows into the sump or sumps of the pumphouse of a rising sewer. In consequence, the period for which each given volume of sewage is held in a rising sewer will vary. Consequently it will be desirable to make corresponding variations in the rate of injection of oxygen each time a volume of sewage is pumped. Moreover, diurnal and seasonal fluctuations in the temperature and the BOD of the sewage can also require appropriate adjustments to be made in the rate at which oxygen is injected each time a volume of sewage is pumped. As similar patterns of variations in the rate of flow of sewage into the sump or sumps of a rising sewer, in temperature and in the BOD of the incoming sewage tend to occur each day, it is possible to predetermine how the rate of oxygen injection need be varied each time sewage is pumped. For this purpose a digital or analogue computer can be used. A small digital computer is particularly suitable. If desired, the computer can be used to control the injection of the oxygen-rich gas automatically.

The process according to the present invention can readily be performed in an established sewerage system. Moreover, the injection of oxygen-rich gas can help to reduce the BOD of the sewage.

The apparatus according to the present invention will now be described, by way of example, with reference to the accompanying drawing, of which:

FIG. 1 is a schematic representation of a rising sewer with apparatus for injecting oxygen into sewage flowing therethrough, and With reference to FIG. 1, a rising sewer 2 has an inlet 4 serving an underground pumping station 6. In the pumping station is a sump 3 which receives sewage from the inlet 4, and a pump 5 whose inlet is connected to the outlet of the sump 3 and whose outlet is connected to the inlet of a conduit 7 along which sewage is pumped. The conduit 7 rises in the direction of the flow of sewage therethrough and ends in an outfall 8 through which sewage falls into a gravity sewer (not shown).

Located near to the inlet of the conduit 7 is a non-return (or reflux) valve 9 to prevent backflow of sewage into the pump 5. An injector pipe 16 is located in the conduit 7 near to the non-return valve 9 and between the valve 9 and the outfall 8. Oxygen to be injected into the sewer from the pipe 16 is conducted thereto through a conduit 18 passing from an oxygen converter 20 (located above ground) downwards through an access shaft 22. The oxygen converter 20 comprises a vacuum-insulated container 24 and a vaporizer 26.

Passage of oxygen into the injector-pipe 16 is controlled by a flow control valve 28. This valve is desirably a solenoid valve which is operated automatically to adjust the rate of flow of oxygen to the pipe 16 in accordance with variations in the value of the concentration of dissolved oxygen measured at the outfall 8 of the rising main 2 by a dissolved oxygen meter 30.

The process according to the present invention is now illustrated by the following example.

EXAMPLE 26,800 liters of domestic sewage per hour were passed into the sump of a rising sewer 1140 main length and 200 mm in diameter. The concentration of dissolved oxygen in the incoming sewage was 6 ppm (parts per million). The temperature of the incoming sewage was 15° C.

The sump of the rising sewer had a total capacity of 5000 liters, and each time it was filled, pumping was started and continued for a period 2 minutes 50 seconds only. During each period of pumping 0.108 m$^3$ of pure oxygen gas was injected into the sewage at a pressure of 3 bars. Injection of the oxygen was discontinued when pumping was stopped.

No trace of hydrogen sulphide was detected at the outfall of the rising sewer.

We claim:

1. A process of treating sewage in a pumped sewer to maintain aerobic metabolism prior to subjecting the sewage to primary treatment which comprises the steps of:
   a. sumping sewage to be treated at an inlet end of the pumped sewer;
   b. pumping the sewage upwardly through the pumped sewer in a manner to maintain the sewer in a flooded condition;
   c. injecting under pressure into the sewage in the pumped sewer, an oxygen-rich gas which contains at least 90% by volume of oxygen in a manner wherein substantially all the gas introduced is dissolved in the sewage being pumped without formation of a discrete gas phase in the pumped sewer such as can cause vapor locks; and
   d. providing sufficient oxygen as in (c) to insure that aerobic metabolism is maintained throughout the length of the pumped sewer during residence of the sewage therein.

2. A process according to claim 1, in which the gas contains at least 98% by volume of oxygen.

3. A process according to claim 1, in which the concentration of dissolved oxygen in the sewage is monitored downstream, in respect of the direction of flow of the sewage, of where the gas is injected, and the rate at which the oxygen-rich gas is injected is adjusted in accordance with changes in the monitored value of the concentration of dissolved oxygen.

4. A process according to claim 1, in which the Biochemical Oxygen Demand of the sewage is monitored, and the rate at which the gas is injected is adjusted in accordance with changes in the monitored value of the Biochemical Oxygen Deman.

5. A process according to claim 1, in which the oxygen-rich gas is injected in at least two separate regions of the sewer.

6. A process according to claim 1, in which the sewage entering the sewer contains dissolved oxygen, and the oxygen-rich gas is injected sufficiently near to the inlet of the sewer to ensure that bacterial reduction of compounds containing oxygen and sulphur does not start before the sewage reaches the region or regions of injection.

7. A process as claimed in claim 1, in which the sewage entering the sewer contains dissolved sulphide, and the oxygen-rich gas is injected at a sufficient distance from the outlet of the sewer to ensure that the sewage leaving the sewer is exhausted of dissolved sulphide.

8. A process as claimed in claim 7, in which the concentration of dissolved sulphide is monitored, and the rate of injection of the oxygen-rich gas adjusted in accordance with changes in the monitored value.

9. A process according to claim 1, in which the gas is injected into the volute of a pump used to transfer the sewage along the sewer.

10. A process of treating sewage to maintain aerobic metabolism prior to pumping the sewage through a rising sewer to a primary treatment plant which comprises the steps of:

a. sumping sewage to be treated in a sump of a pumphouse of a rising sewer;
b. injecting under pressure an oxygen-rich gas which contains at least 90% by volume of oxygen into the sumped sewage in a manner wherein substantially all the gas introduced is dissolved in the sewage wherein the oxygen-rich gas does not collect as a discrete gas phase in any gas space that may exist above the sumped sewage; and
c. providing sufficient oxygen as in (b) to insure that aerobic metabolism is maintained in the sump while the sumped sewage is awaiting pumpout to the rising sewer.

* * * * *